US009113092B2

(12) United States Patent
Fukui et al.

(10) Patent No.: US 9,113,092 B2
(45) Date of Patent: Aug. 18, 2015

(54) IMAGING APPARATUS THAT CAN REDUCE AN ADVERSE EFFECT DUE TO AN EXTERNAL FLASH WHEN AN ELECTRONIC SHUTTER IS USED

(71) Applicant: Panasonic Corporation, Osaka (JP)

(72) Inventors: Katsuyuki Fukui, Osaka (JP); Tatsushi Bannai, Osaka (JP)

(73) Assignee: PANASONIC INTELLECTUAL PROPERTY MANAGEMENT CO., LTD, Osaka (JP)

( * ) Notice: Subject to any disclaimer, the term of this patent is extended or adjusted under 35 U.S.C. 154(b) by 151 days.

(21) Appl. No.: 13/898,577

(22) Filed: May 21, 2013

(65) Prior Publication Data

US 2014/0253755 A1    Sep. 11, 2014

(30) Foreign Application Priority Data

Mar. 8, 2013  (JP) ................................ 2013-046320
Apr. 24, 2013  (JP) ................................ 2013-091320

(51) Int. Cl.
*H04N 9/73*  (2006.01)
*H04N 5/222*  (2006.01)
*H04N 5/235*  (2006.01)

(52) U.S. Cl.
CPC ............. *H04N 5/2357* (2013.01); *H04N 5/235* (2013.01); *H04N 5/2353* (2013.01)

(58) Field of Classification Search
CPC ... H04N 5/2353; H04N 5/2351; H04N 5/235; H04N 5/2357

USPC ............... 348/371, 226.1, 241, 258, 255, 132
See application file for complete search history.

(56) References Cited

U.S. PATENT DOCUMENTS

| 8,558,944 | B2 * | 10/2013 | Makii | 348/362 |
| 8,947,588 | B2 * | 2/2015 | Shirakawa | 348/371 |
| 2009/0244317 | A1 * | 10/2009 | Makii | 348/229.1 |
| 2011/0273591 | A1 * | 11/2011 | Fukushima | 348/239 |
| 2011/0317029 | A1 | 12/2011 | Fukui et al. | |
| 2013/0208144 | A1 * | 8/2013 | Shirakawa | 348/234 |

FOREIGN PATENT DOCUMENTS

WO    WO 2010/100866 A1    9/2010

* cited by examiner

*Primary Examiner* — Ahmed A Berhan
(74) *Attorney, Agent, or Firm* — Renner, Otto, Boisselle & Sklar, LLP

(57) ABSTRACT

If a flash detector determines that a video signal generated by an imager is affected by a flash when an electronic shutter is used, the imager generates the video signal representing a preceding unit image determined to be affected by the flash, and then a video signal representing a succeeding unit image that is consecutively exposed from the previous unit image for the same exposure period as the preceding exposure period, by setting a next time of a read signal to be earlier than a preceding time. A flash corrector uses the video signal representing the preceding unit image determined to be affected by the flash, and the video signal representing the succeeding unit image following the preceding unit image to generate a video signal in which a bright portion having a band shape affected by the flash is corrected.

3 Claims, 8 Drawing Sheets

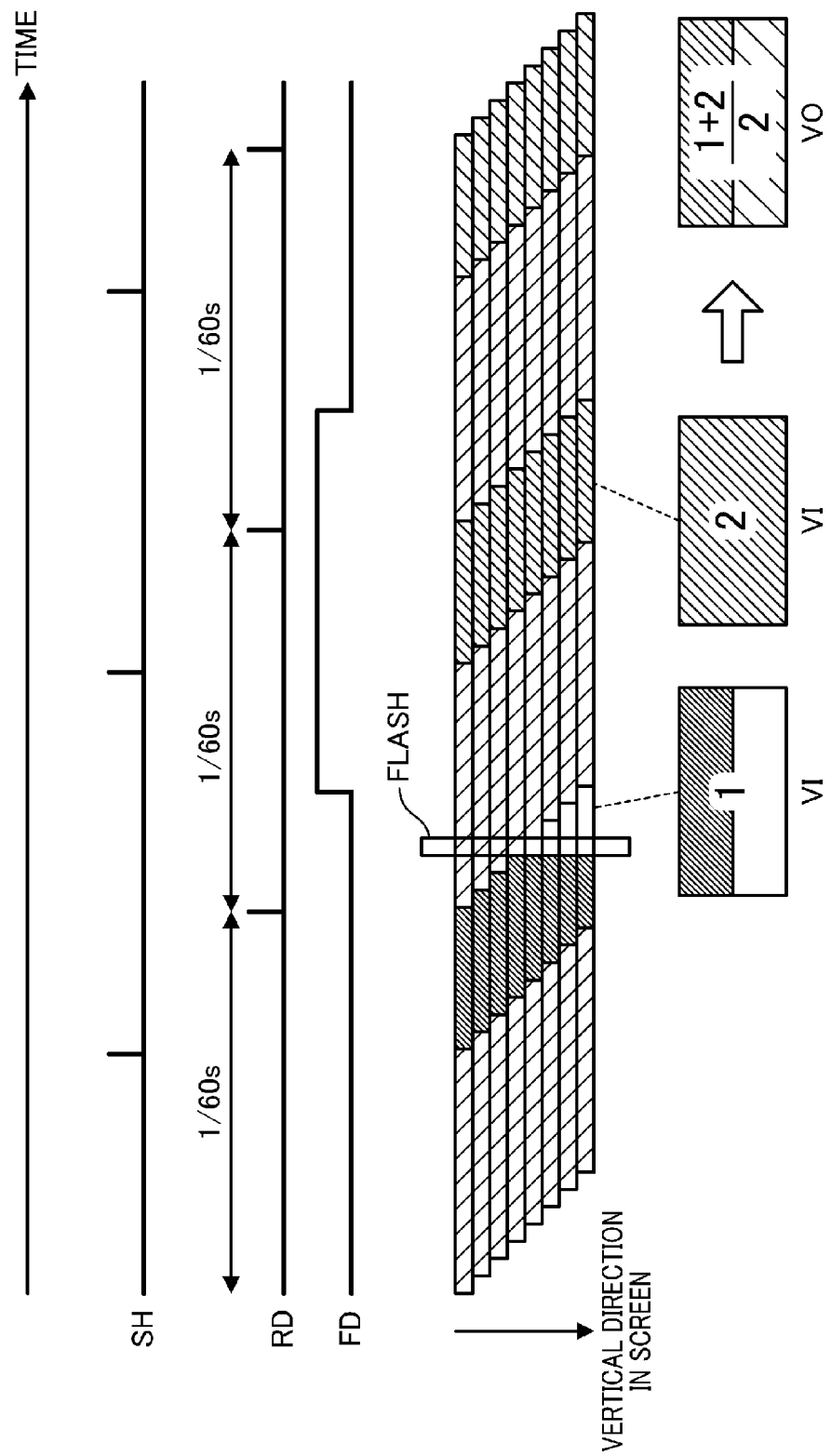

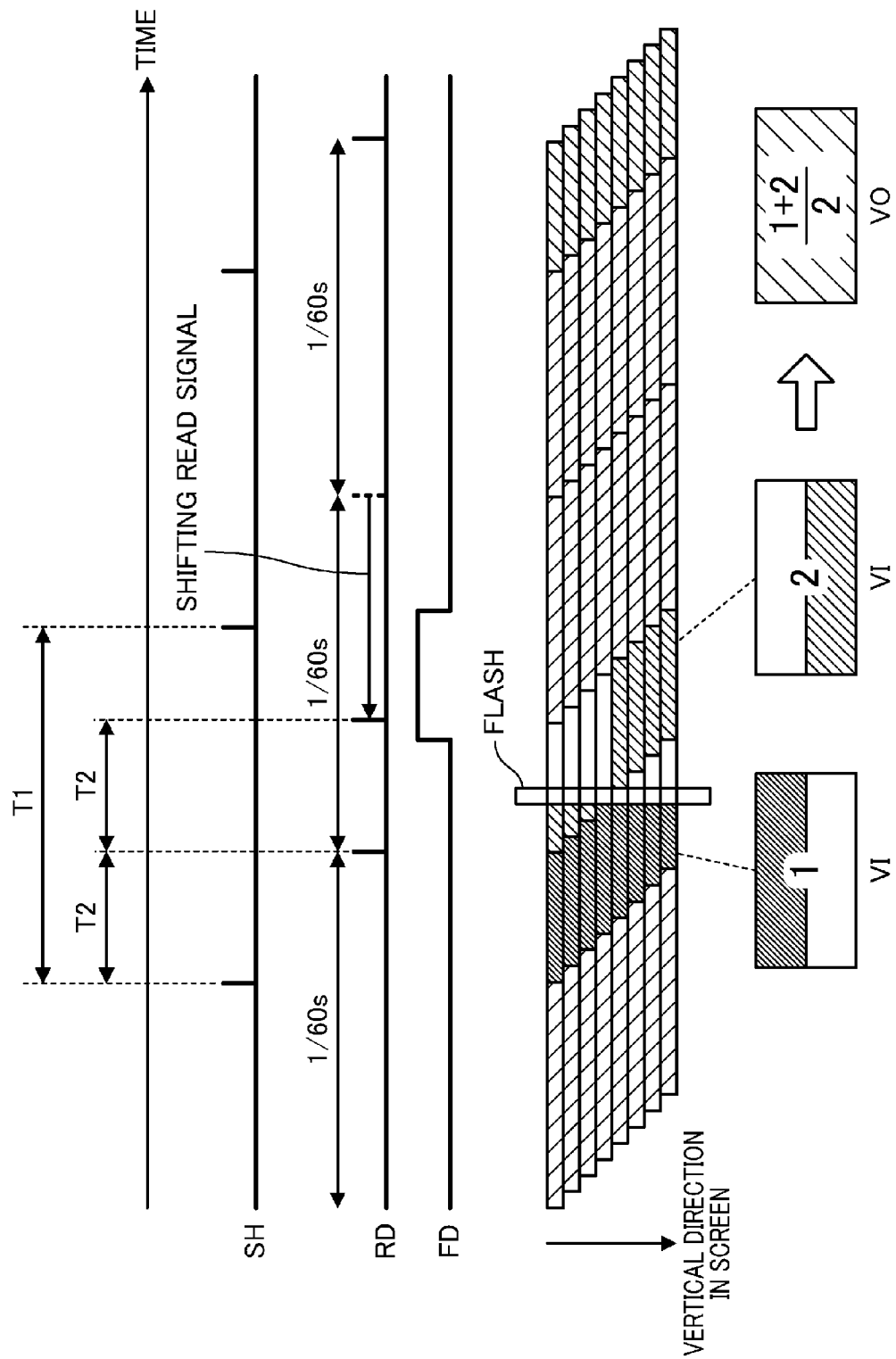

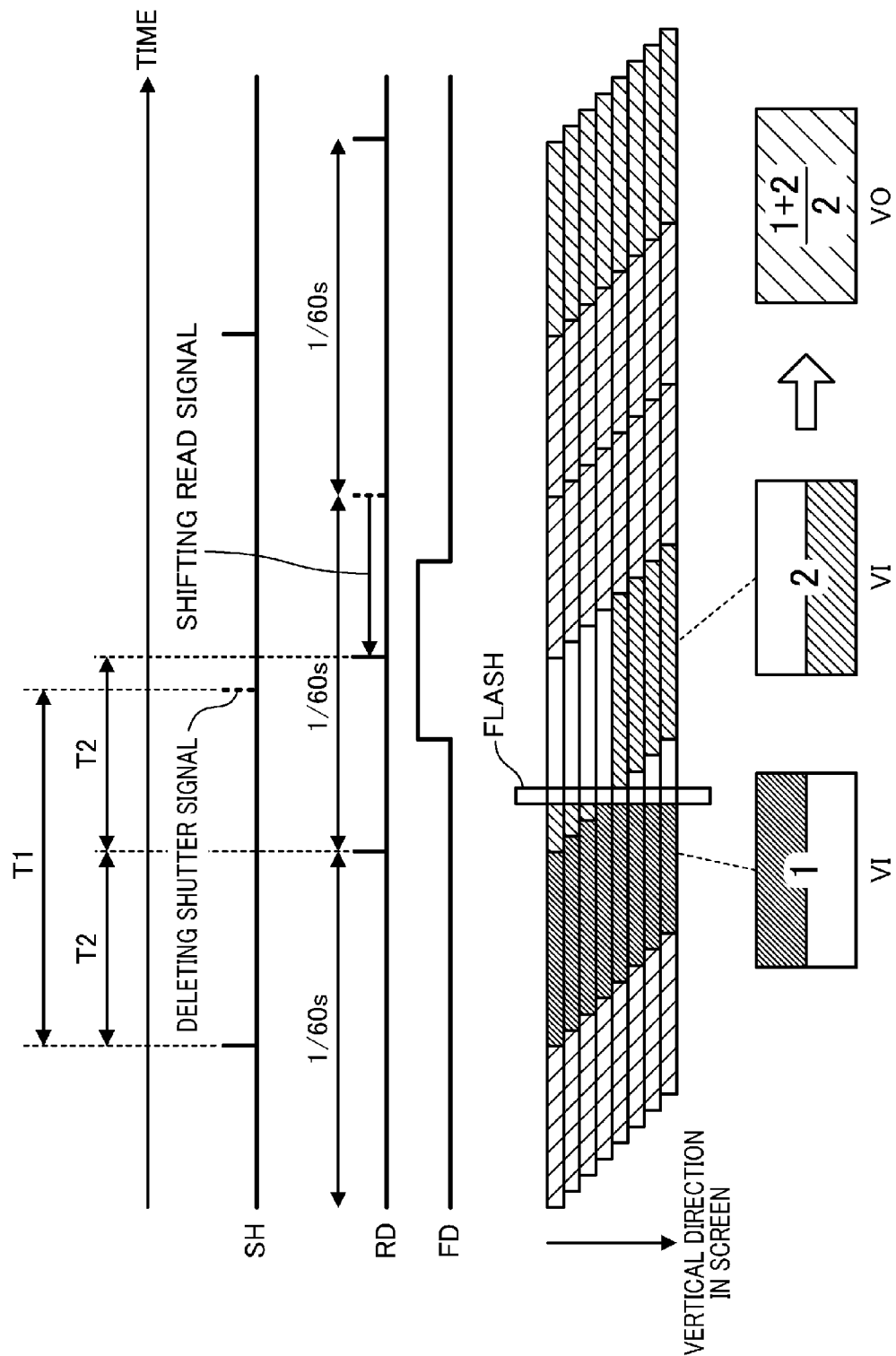

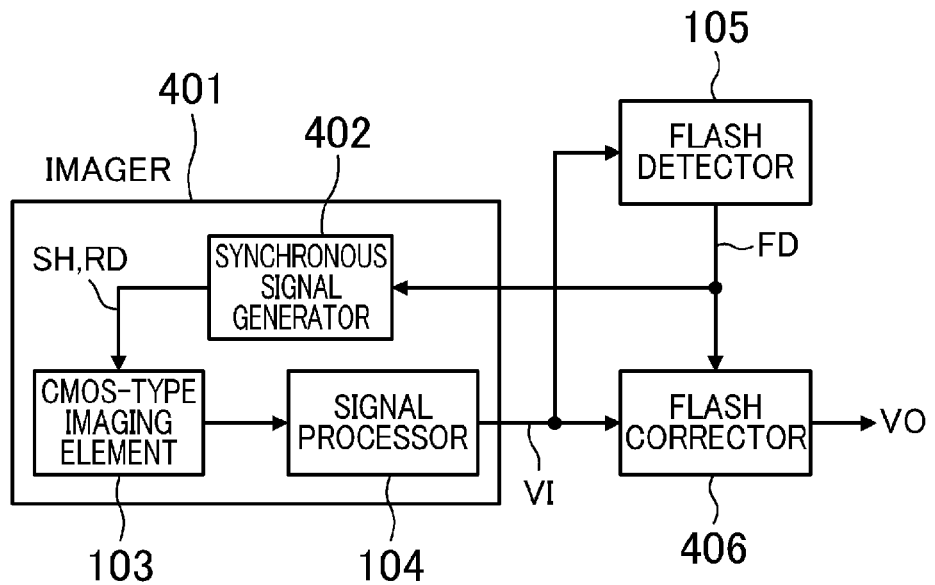
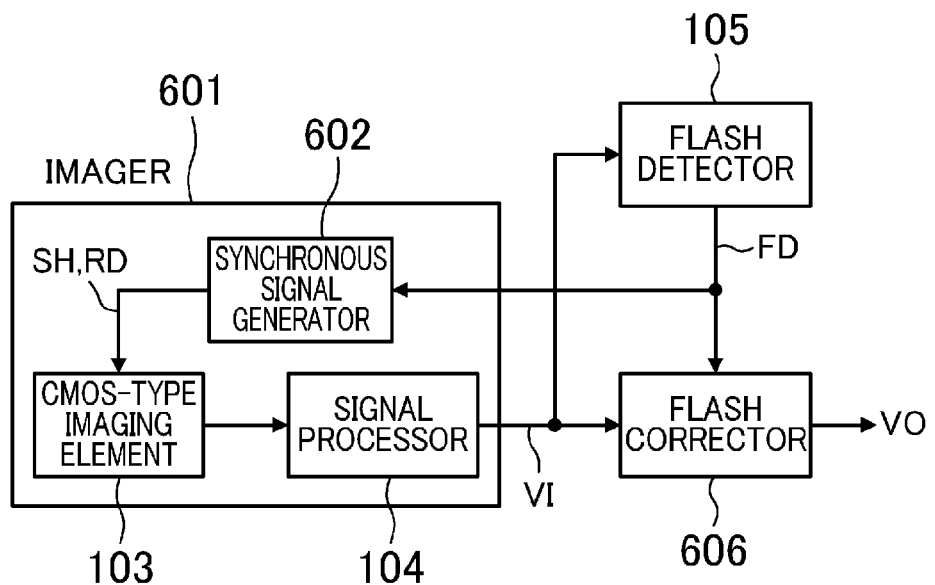

IMAGING APPARATUS THAT CAN REDUCE AN ADVERSE EFFECT DUE TO AN EXTERNAL FLASH WHEN AN ELECTRONIC SHUTTER IS USED

CROSS-REFERENCE TO RELATED APPLICATION

This application claims priority to Japanese Patent Applications No. 2013-046320 filed on Mar. 8, 2013, and No. 2013-091320 filed on Apr. 24, 2013, the entire disclosure of which is incorporated by reference herein.

BACKGROUND

The present disclosure relates to imaging apparatuses such as digital cameras and video cameras (camcorders) for capturing consecutive images.

Many complementary metal oxide semiconductor (CMOS) type imaging elements use a rolling shutter technique for allowing exposure to sequentially start for each horizontal line (hereinafter referred to as "line"), and sequentially reading video signals of respective lines to form a frame. In the imaging element using the rolling shutter technique, the starting time and ending time of the exposure period differ for each line. Therefore, if an external flash etc. is used during a period that is shorter than one frame period, a band portion with a high intensity may appear on output video of the imaging element.

International Patent Publication No. WO 2010/100866 discloses a technique for correcting a white band due to a flash by averaging video signals of two consecutive frames affected by the flash.

SUMMARY

The present disclosure provides an imaging apparatus that can reduce an adverse effect due to an external flash when an electronic shutter is used.

An imaging apparatus includes: an imager having an imaging element, and configured to convert an optical signal incident from an object into an electrical signal to generate and output a video signal; a flash detector configured to detect whether the video signal generated by the imager is affected by a flash or not; and a flash corrector configured to, if the flash detector determines that the video signal generated by the imager is affected by the flash, use the video signal representing a preceding unit image determined to be affected by the flash, and the video signal representing a succeeding unit image following the preceding unit image to generate the video signal in which a bright portion having a band shape affected by the flash is corrected. In the imaging element, a shutter signal defining a time for dumping a charge obtained by exposure controls an electronic shutter operation. The imaging element generates and outputs the video signal by receiving a read signal at a time delayed by an exposure period relative to the shutter signal. If the flash detector determines that the video signal generated by the imager is affected by the flash when an electronic shutter is used, the imager generates the video signal representing the preceding unit image determined to be affected by the flash, and then the video signal representing the succeeding unit image that is consecutively exposed from the preceding unit image for the same exposure period as a preceding exposure period, by setting a succeeding time of the read signal to be earlier than a preceding time.

The present disclosure can provide an imaging apparatus that can eliminate an unnatural screen with a bright lateral band caused by an external flash when an electronic shutter is used, and obtain video with secured continuity as a moving image while allowing to know whether the flash enters the imaging apparatus or not.

BRIEF DESCRIPTION OF THE DRAWINGS

FIG. 3 is an illustration of read images in an imaging apparatus of a comparative example when an external flash enters the imaging apparatus while an electronic shutter is used.

FIG. 4 is an illustration of read images in the imaging apparatus of FIG. 1 when an external flash enters the imaging apparatus while an electronic shutter is used.

FIG. 5 is another illustration of read images in the imaging apparatus of FIG. 1 when an external flash enters the imaging apparatus while the electronic shutter is used.

FIG. 6 illustrates a structure of an imaging apparatus according to a second embodiment.

FIG. 8 illustrates a structure of an imaging apparatus according to a third embodiment.

DETAILED DESCRIPTION

Embodiments are described in detail below with reference to the attached drawings. However, unnecessarily detailed description may be omitted. For example, detailed description of well-known techniques or description of the substantially same elements may be omitted. Such omission is intended to prevent the following description from being unnecessarily redundant and to help those skilled in the art easily understand it.

Inventor(s) provides the following description and the attached drawings to enable those skilled in the art to fully understand the present disclosure. Thus, the description and the drawings are not intended to limit the scope of the subject matter defined in the claims.

First Embodiment

1-1. Structure of Imaging Apparatus

Figure 1:
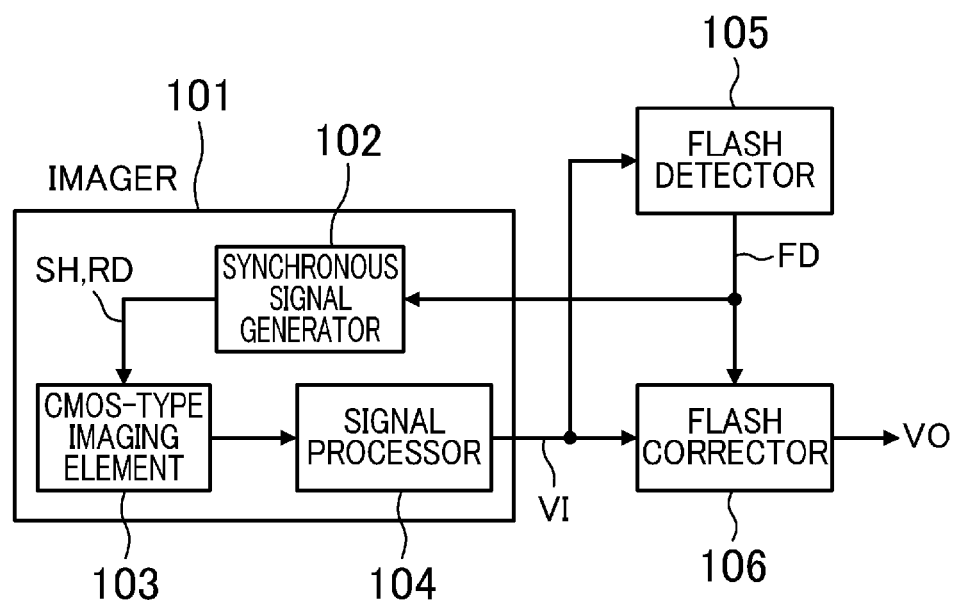
FIG. 1 illustrates a structure of an imaging apparatus according to a first embodiment.

FIG. 1 illustrates a structure of an imaging apparatus according to a first embodiment. As illustrated in FIG. 1, the imaging apparatus includes an imager 101 configured to image an object to generate a video signal VI, a flash detector 105 configured to detect presence or absence of an external flash within an image based on the video signal VI generated by the imager 101 in screen units to generate a flash detection signal FD including information on the detected result, and a flash corrector 106 configured to correct the video signal VI affected by the external flash from the imager 101 in accordance with the flash detection signal FD generated by the flash detector 105 to output a video signal VO obtained by the flash correction process.

The imager 101 includes a CMOS-type imaging element 103 configured to condense light from an object, and perform photoelectric conversion of the condensed light, a synchronous signal generator 102 configured to control the CMOS-type imaging element 103, and a signal processor 104 configured to perform a gain adjustment and an adjustment of direct current component with respect to a video signal output from the CMOS-type imaging element 103 at a time defined by a synchronous signal output from the synchronous signal generator 102, and the imager 101 outputs the video signal VI.

The synchronous signal generator 102 generates a shutter signal SH that is a synchronous signal output at a predetermined interval and defining a time for dumping charges obtained by exposure, and outputs the shutter signal SH to the CMOS-type imaging element 103, thereby allowing an electronic shutter to operate. The synchronous signal generator 102 generates a read signal RD at a time that is delayed by an exposure period relative to the shutter signal SH, and outputs the read signal RD to the CMOS-type imaging element 103. Specifically, the video signal is output from the CMOS-type imaging element 103 in accordance with the read signal RD generated by the synchronous signal generator 102 at an interval of a field frequency (1/60-second interval). The signal processor 104 performs the gain adjustment such as white balance, and the adjustment of direct current component such as black level adjustment to generate the video signal VI.

Figure 2:
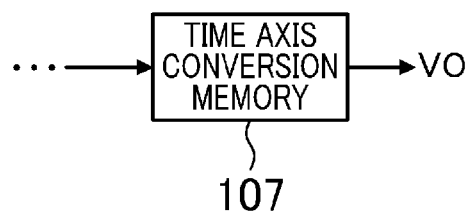
FIG. 2 illustrates a time axis conversion memory advantageously disposed at the output stage of a flash corrector of FIG. 1.

FIG. 2 illustrates a time axis conversion memory 107 advantageously disposed at the output stage of the flash corrector 106. The time axis conversion memory 107 is a high-capacity memory to adjust a time for outputting the video signal VO.

1-2. Operations of Imaging Apparatus

Assuming that a read signal RD is constantly generated at a predetermined interval as illustrated in FIG. 3, a white band may not be eliminated when the electronic shutter is used. For example, assume that a shutter signal SH is input to the CMOS-type imaging element 103 and the shutter is allowed to operate at a time illustrated in FIG. 3. If a flash enters while an image 1 of the video signal VI is read out, a lower half of the screen of the image 1 has a bright band portion due to the effect of the flash. Charges having been stored at this point of time are dumped at the second assertion of the shutter signal SH in FIG. 3, and therefore, an image 2 of the video signal VI is an image that is not affected by the flash. If the images 1 and 2 of the video signal VI are averaged, an image of the signal VO in FIG. 3 is obtained, which still suffers from a step change in brightness at a boundary of a white band portion due to the effect of the flash.

FIG. 4 is an illustration of read images in the imaging apparatus of FIG. 1 when an external flash enters the imaging apparatus while the electronic shutter is used. Assume that flash enters while the image 1 of the video signal VI is read out as illustrated in FIG. 4. At that time, the flash detector 105 determines that the flash enters when reading the image 1 of the video signal VI is finished, and outputs "1" as a flash detection signal FD while image 2 is output. The value "1" of the flash detection signal FD represents being affected by a flash, whereas the value "0" of the flash detection signal FD represents being not affected by a flash. When the flash detection signal FD represents "1," the synchronous signal generator 102 generates the read signal RD at a time earlier than the usual time such that the charges are consecutively stored from the previous image, i.e., the image 1, and an exposure period is the same as the previous exposure period as illustrated in FIG. 4. As a result, the lower part of the screen of the image 2 has a bright band. The flash corrector 106 averages the images 1 and 2 of the video signal VI to obtain an image of the signal VO in FIG. 4. This can obtain an image in which the effect of the flash is corrected.

In the read operation from the CMOS-type imaging element 103, if the field frequency of the final video signal is 60 Hz, the CMOS-type imaging element 103 has to complete a correction process within a period shorter than 1/60 second. In the stage of generating a corrected image, the filed frequency is not the final one, a time axis is converted by using the time axis conversion memory 107 after the corrected image is formed. When an image is read out from the time axis conversion memory 107, the generated corrected image may be used only one time, or may be used two times. In other words, assuming that input images are numbered from 0 to 3 (the images 1 and 2 are affected by a flash illustrated in FIG. 4), the input images may be output in the order of the image 0, image 0, the corrected image, and the image 3, or may be output in the order of the image 0, the corrected image, the corrected image, and the image 3.

As illustrated in FIG. 5, a shutter signal SH generated immediately after a flash is detected, thus, a shutter signal SH generated first after the flash detection signal FD is 1 may be deleted. That is because the shutter signal SH may be output earlier than the read signal RD depending on the operation of the CMOS-type imaging element 103, and at that time, if the entry of a flash is immediately detected, the shutter signal SH is deleted to obtain an image affected by the flash as a video signal VI.

The system of FIG. 4 may be selected if the expression of 2×T2<T1 is satisfied, and the system of FIG. 5 may be selected if the expression of 2×T2≥T1 is satisfied where T1 is the field frequency and T2 is the exposure period.

1-3. Advantages

By the operations described above, when an external flash enters while the electronic shutter is used, a part of an image affected by the flash is not eliminated, and therefore, a white band can be corrected by using two consecutive images, one of which is affected by the flash in its lower portion, the other of which is affected by the flash in its upper portion. Therefore, the operations of the first embodiment can know the entry of a flash, and can reduce a case where an unnatural image having a bright band portion is generated.

In the first embodiment, the method of averaging images are used as the method of generating a corrected image from two consecutive images affected by a flash. However, another method may be used.

Second Embodiment

2-1. Structure of Imaging Apparatus

FIG. 6 illustrates a structure of an imaging apparatus according to a second embodiment. As illustrated in FIG. 6, the imaging apparatus includes an imager 401 configured to image an object to generate a video signal VI, a flash detector 105 configured to detect presence or absence of an external flash within an image based on the video signal VI generated by the imager 401 in screen units to generate a flash detection signal FD including information on the detected result, and a flash corrector 406 configured to correct the video signal VI affected by the external flash from the imager 401 in accordance with the flash detection signal FD generated by the flash detector 105 to output a video signal VO obtained by the flash correction process.

The imager 401 includes a CMOS-type imaging element 103 configured to condense light from an object, and perform photoelectric conversion of the condensed light, a synchronous signal generator 402 configured to control the CMOS-type imaging element 103, and a signal processor 104 configured to perform a gain adjustment and an adjustment of direct current component with respect to a video signal output from the CMOS-type imaging element 103 at a time defined by a synchronous signal output from the synchronous signal generator 102, and the imager 401 outputs the video signal VI.

The synchronous signal generator 402 generates a shutter signal SH that is a synchronous signal output at a predetermined interval and defining a time for dumping charges obtained by exposure, and outputs the shutter signal SH to the CMOS-type imaging element 103, thereby allowing an electronic shutter to operate. The synchronous signal generator 402 generates a read signal RDA at a time that is delayed by an exposure period relative to the shutter signal SH, and a read signal RDB at a time that is delayed by the same exposure period relative to the read signal RDA, and outputs the read signals RDA and RDB (collectively referred to as "read signal RD") having two phases to the CMOS-type imaging element 103, whereby the video signal is generated from the CMOS-type imaging element 103.

2-2. Operations of Imaging Apparatus

Figure 7:
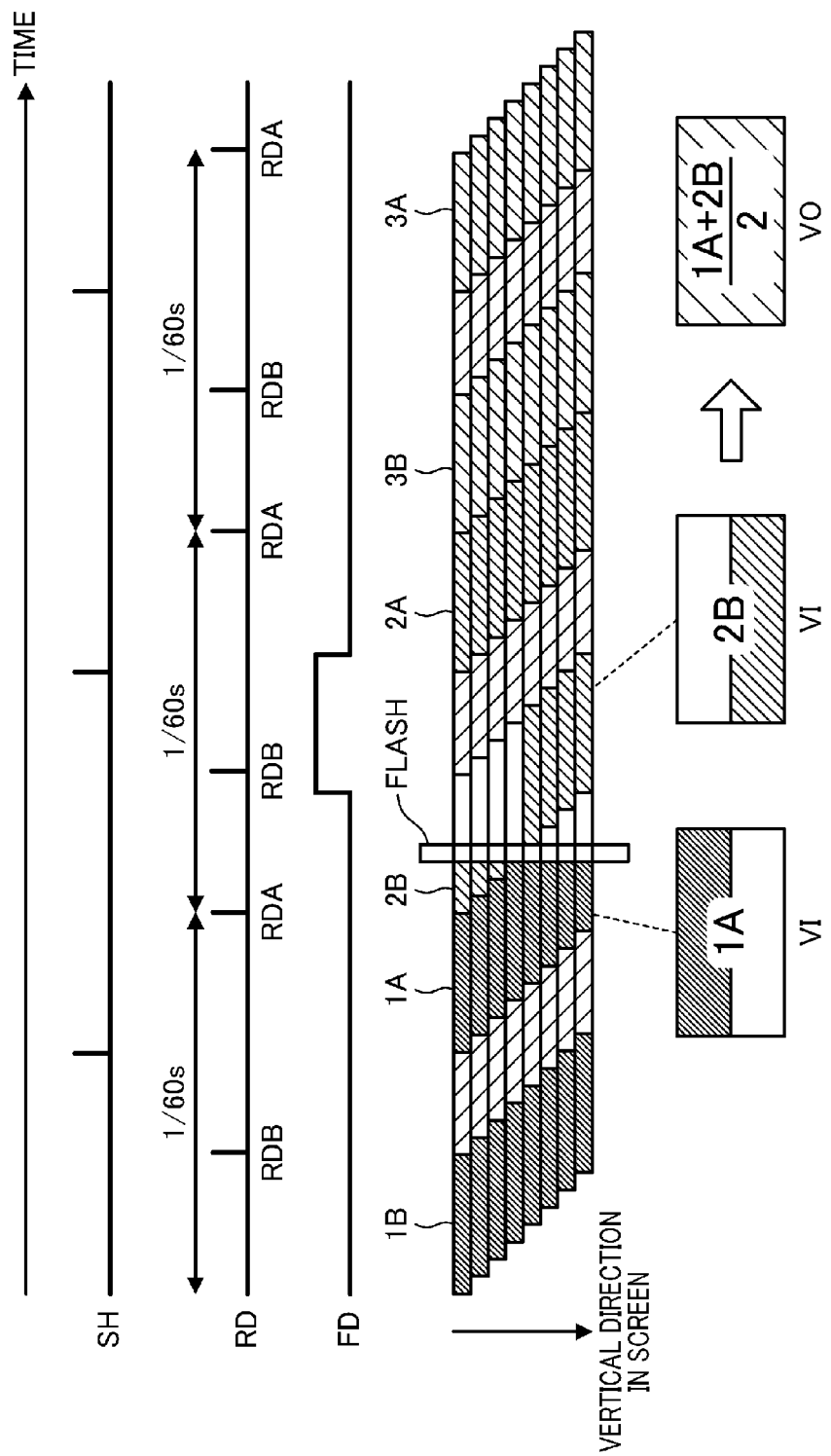
FIG. 7 is an illustration of read images in the imaging apparatus of FIG. 6 when an external flash enters the imaging apparatus while an electronic shutter is used.

The operation of the imaging apparatus having the structure described above will be described with reference to FIG. 7. FIG. 7 is an illustration of read images in the imaging apparatus of FIG. 6 when an external flash enters the imaging apparatus while the electronic shutter is used.

The imager 401 of this embodiment has the same structure as that of the first embodiment except the structure of the imager 401 in which both a video signal (the image B of FIG. 7) that is used only in the shutter operation, and a video signal (the image A of FIG. 7) that is usually used are usually read out from the CMOS-type imaging element 103.

As illustrated in FIG. 7, assume that a flash enters while an image 1A of the video signal VI is read out. At that time, the CMOS-type imaging element 103 outputs an image nA of the read signal RDA output from the synchronous signal generator 402, and an image nB of the read signal RDB output from the synchronous signal generator 402 (n is an integer). The read signal RDA is generated such that the generation is delayed by a shutter speed period (storing period of charges) from the generation of the shutter signal SH, and the read signal RDB is generated such that the generation is delayed by the same shutter speed period from the generation of the read signal RDA.

Charges in the image nA and the image (n+1) B are consecutively stored (storing periods of charges are consecutive), and the image nA and the image (n+1) B are usually read out from the CMOS-type imaging element 103. Regarding images 1A, 2B, 2A, and 3B of FIG. 7, the flash corrector 406 usually averages the images 1A and 2B, and averages the images 2A and 3B. Therefore, if the flash detection signal FD is "1," an image obtained by averaging the image 1A in which a bright band appears on the lower part of the screen due to the effect of a flash and the image 2B in which a bright band appears on the upper part of the screen due to the effect of the flash is generated as a corrected image.

As well as the first embodiment, a time axis is converted by a high-capacity memory by using the generated corrected image and the image nA after the generation of the corrected image, and assuming that input images are numbered in the order of 0B, 0A, 1B, 1A, 2B, 2A, 3B, and 3A (the images 1A and 2B are affected by a flash illustrated in FIG. 7), the input images may be output in the order of the image 0A, the image 0A, the corrected image, and the image 3A.

2-3. Advantages

By the operations described above, in the second embodiment, when an external flash enters while the electronic shutter is used, a part of an image affected by the flash is not eliminated, and therefore, a white band can be corrected by using two consecutive images, one of which is affected by the flash in its lower portion, the other of which is affected by the flash in its upper portion. Therefore, the operations of the second embodiment can know the entry of a flash, and can reduce a case where an unnatural image having a bright band portion is generated.

If the shutter speed becomes faster, and the time of reading the final line of image nA usually used is close to the time of reading the first line of image (n+1) B, the flash detection cannot be processed within a given time period in the first embodiment. The second embodiment is particularly effective in such a case.

Third Embodiment 3-1. Structure of Imaging Apparatus

FIG. 8 illustrates a structure of an imaging apparatus according to a third embodiment. As illustrated in FIG. 8, the imaging apparatus includes an imager 601 configured to image an object to generate a video signal VI, a flash detector 105 configured to detect presence or absence of an external flash within an image based on the video signal VI generated by the imager 601 in screen units to generate a flash detection signal FD including information on the detected result, and a flash corrector 606 configured to correct the video signal VI affected by the external flash from the imager 601 in accordance with the flash detection signal FD generated by the flash detector 105 to output a video signal VO obtained by the flash correction process.

The imager 601 includes a CMOS-type imaging element 103 configured to condense light from an object, and performs photoelectric conversion of the condensed light, a synchronous signal generator 602 configured to control the CMOS-type imaging element 103, and a signal processor 104 configured to perform a gain adjustment and an adjustment of direct current component with respect to a video signal output from the CMOS-type imaging element 103 at a time defined by a synchronous signal output from the synchronous signal generator 602, and the imager 601 outputs the video signal VI.

The synchronous signal generator 602 generates a shutter signal SH that is a synchronous signal output at a predetermined interval and defining a time for dumping charges obtained by exposure, and outputs the shutter signal SH to the CMOS-type imaging element 103, thereby allowing an electronic shutter to operate. The synchronous signal generator 602 generates a read signal RDA at a time that is delayed by an exposure period relative to the shutter signal SH, and a read signal RDD at a time that is delayed by the same exposure period relative to the read signal RDA, and in a similar manner, generates read signals RDC and RDB each at a time that is delayed by the same exposure period such that the interval of the four exposure periods is as short as 1/60 second. The read signals RDA, RDD, RDC, and RDB (collectively referred to as "read signal RD") having a plurality of phases (four phases in this embodiment) are output to the CMOS-type imaging element 103, whereby the video signal is generated from the CMOS-type imaging element 103.

3-2. Operations of Imaging Apparatus

Figure 9:
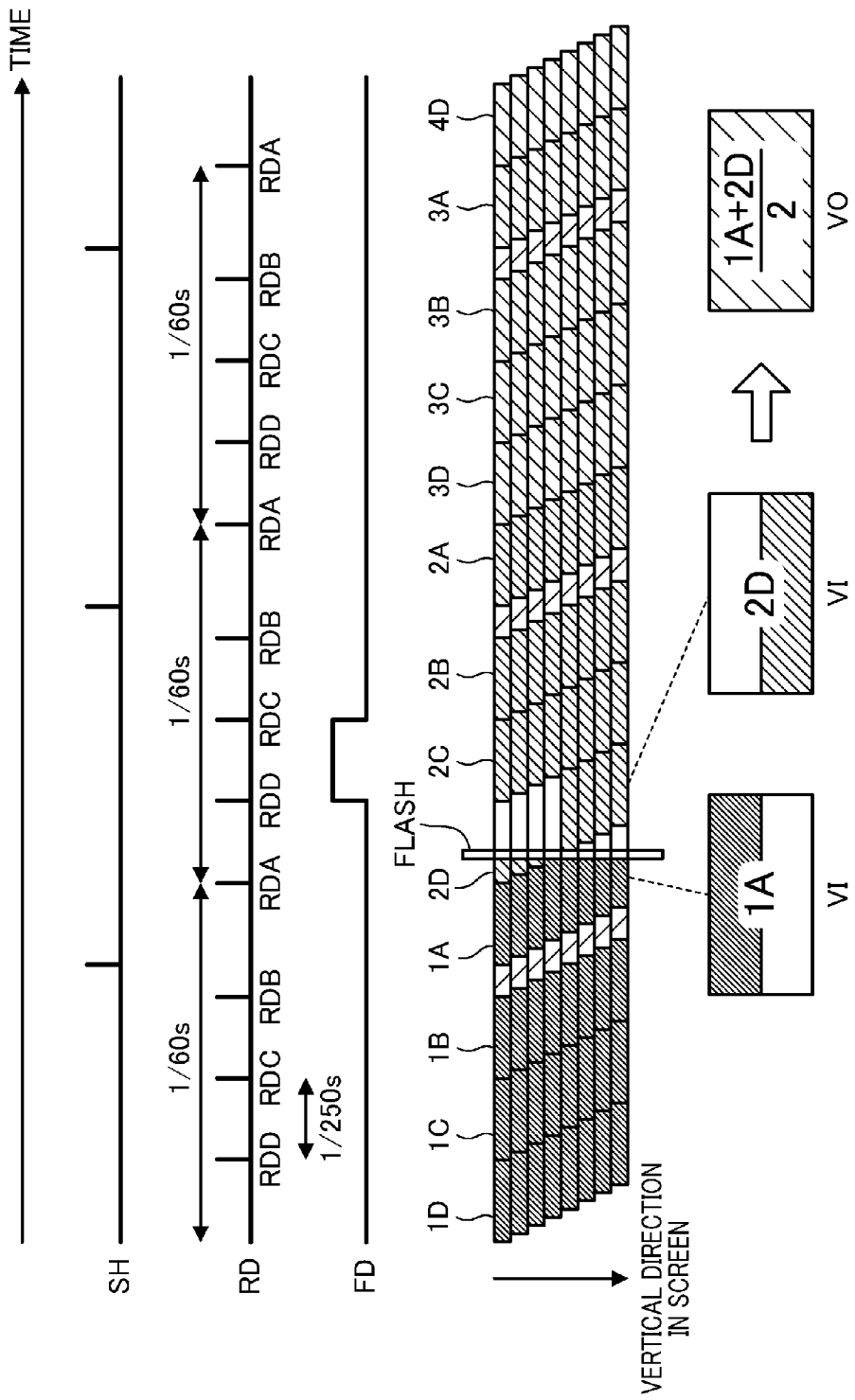
FIG. 9 is an illustration of read images in the imaging apparatus of FIG. 8 when an external flash enters the imaging apparatus while an electronic shutter is used.
Figure 10:
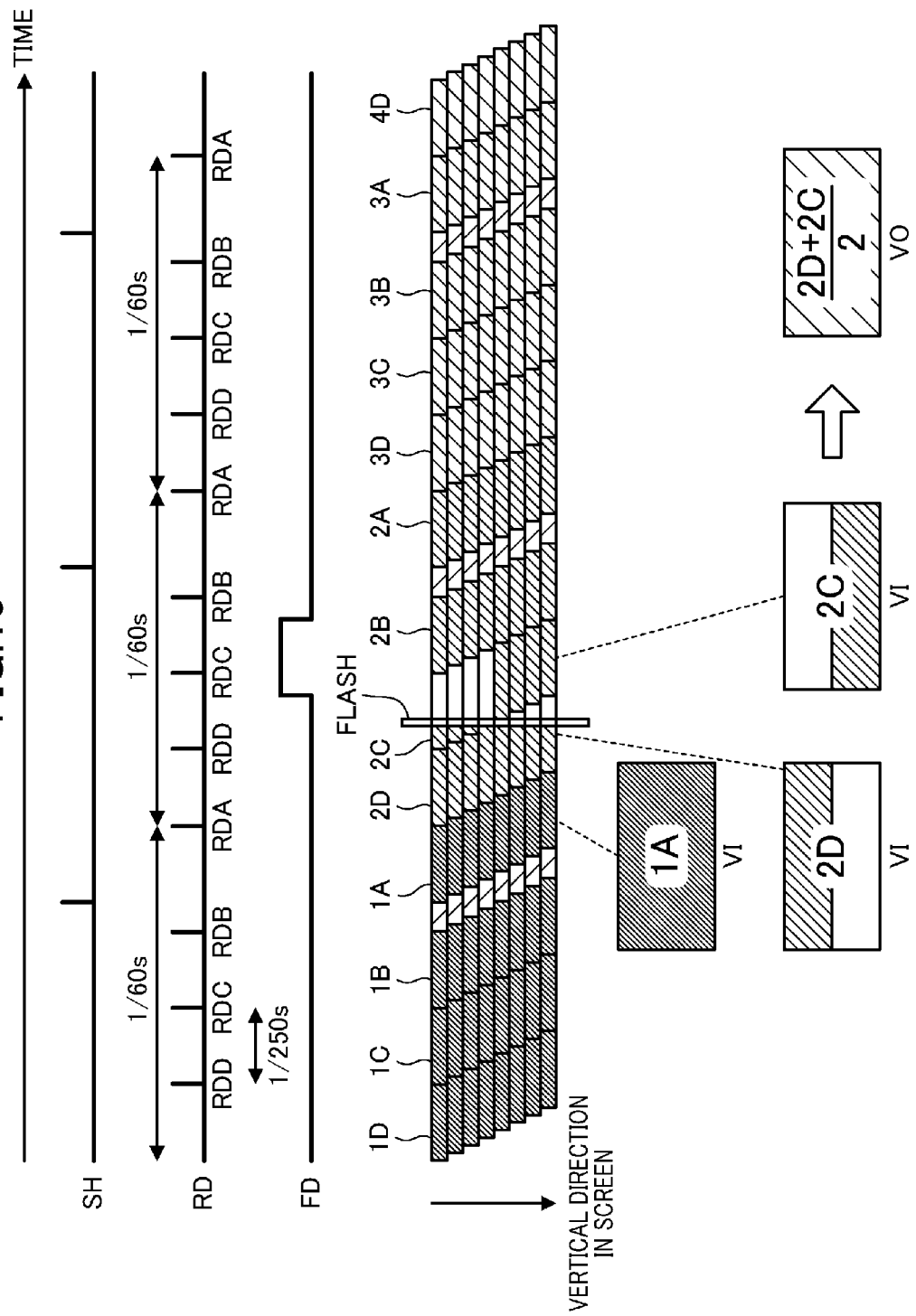
FIG. 10 is another illustration of read images in the imaging apparatus of FIG. 8 when an external flash enters the imaging apparatus while the electronic shutter is used.

The operation of the imaging apparatus having the structure described above will be described with reference to FIGS. 9 and 10. FIGS. 9 and 10 are illustrations of read images in the imaging apparatus of FIG. 8 when an external flash enters the imaging apparatus while the electronic shutter is used.

When the imaging apparatus generates a video signal at a 1/60-second interval (field frequency of 60 Hz), if the electronic shutter is set to operate at a 1/250-second interval, an image labeled as "nA" (n is an integer) in which an exposure time is 1/250 second, and images labeled as "(n+1) D," "(n+1) C," and "(n+1) B" each in which an exposure time is also 1/250 second are sequentially read out, as illustrated in FIG. 9. In this case, there exists a time margin of 0.667 ms, during which the electronic shutter is allowed to operate to dump excess charges (see hatching inclined downward to the right). For example, image 1A is read out, and then, images 2D, 2C, and 2B are sequentially read out. At that time, an inclined portion next to image 2B is left, and therefore, the electronic shutter is allowed to operate to dump excess charges. In FIG. 9, the portion corresponding to 0.667 ms is illustrated wider than an actual size for clarity of illustration.

Among such images, an image labeled as "nA" (n is an integer) is usually output as a final output. However, if a flash enters while the image 1A is read out at a time as illustrated in FIG. 9, a lower half of the screen of the image 1A of the video signal VI has a bright band portion, and an upper half of the screen of the image 2D next to the image 1A has a bright band portion. If a flash enters in the image 1A of the video signal VI, the flash detector 105 detects the presence of the flash emitted into the image 1A of the video signal VI, and generates a flash detection signal FD that is "1" until reading the image 2D next to the image 1A of the video signal VI illustrated in FIG. 9 is finished. The flash corrector 606 averages the images 1A and 2D upon receiving the flash detection signal FD, and generates the video signal VO representing images, one of which is illustrated in FIG. 9. The generated images of the signal VO are output in the order of, e.g., an image 0A, a corrected image, a corrected image, and an image 3A, as described in the first embodiment.

If a flash enters at a time of reading an image not named with "nA" (n is an integer) as illustrated in FIG. 10, image 2D into which the flash enters, and image 2C next to the image 2D are averaged, and the obtained image is used as a corrected image. In the flash corrector 606, the corrected image is once stored in a high-capacity memory, and the image 0A, the corrected image, the corrected image, and the image 3A are sequentially output at a 1/60-second interval.

3-3. Advantages

By the operations described above, in the third embodiment, when an external flash enters while the electronic shutter is used, a part of an image affected by the flash is not eliminated, and therefore, a white band can be corrected by using two consecutive images, one of which is affected by the flash in its lower portion, the other of which is affected by the flash in its upper portion. Therefore, the operations of the third embodiment can know the entry of a flash, and can reduce a case where an unnatural image having a bright band portion is generated.

According to the third embodiment, even if the shutter speed is fast, and a flash enters at a time at which charges stored in the CMOS-type imaging element 103 are fully dumped due to the shutter operation, the effect of the flash can be left, and uneven images with bright lateral bands can be reduced.

Other Embodiments

The time axis conversion memory 107 can be disposed in the exterior of the imaging apparatus. If a proxy video output is used, the disposition of the time axis conversion memory 107 can be omitted.

Various embodiments have been described above as example techniques of the present disclosure, in which the attached drawings and the detailed description are provided.

As such, elements illustrated in the attached drawings or the detailed description may include not only essential elements for solving the problem, but also non-essential elements for solving the problem in order to illustrate such techniques. Thus, the mere fact that those non-essential elements are shown in the attached drawings or the detailed description should not be interpreted as requiring that such elements be essential.

Since the embodiment described above is intended to illustrate the techniques in the present disclosure, it is intended by the following claims to claim any and all modifications, substitutions, additions, and omissions that fall within the proper scope of the claims appropriately interpreted in accordance with the doctrine of equivalents and other applicable judicial doctrines.

The present disclosure provides an imaging apparatus that prevents a lateral band with a high intensity from occurring in a captured image due to an effect of a flash when an electronic shutter is used, and can output images with secured continuity as a moving image. Therefore, the present disclosure is useful for digital cameras and video cameras (camcorders) for capturing consecutive images.

What is claimed is:

1. An imaging apparatus comprising:
   an imager having an imaging element, and configured to convert an optical signal incident from an object into an electrical signal to generate and output a video signal;
   a flash detector configured to detect whether the video signal generated by the imager is affected by a flash or not; and
   a flash corrector configured to, if the flash detector determines that the video signal generated by the imager is affected by the flash, use the video signal representing a preceding unit image determined to be affected by the flash, and the video signal representing a succeeding unit image following the preceding unit image to generate the video signal in which a bright portion having a band shape affected by the flash is corrected, wherein
   in the imaging element, a shutter signal defining a time for dumping a charge obtained by exposure controls an electronic shutter operation,
   the imaging element generates and outputs the video signal in response to receiving a read signal at a time delayed by an exposure period relative to the shutter signal, and
   if the flash detector determines that the video signal generated by the imager is affected by the flash when an electronic shutter is used, the imager generates the video signal representing the preceding unit image determined to be affected by the flash, and then the video signal representing the succeeding unit image that is consecutively exposed from the preceding unit image for the same exposure period as an exposure period for which the preceding unit image is exposed, by shifting a time of the read signal corresponding to the succeeding unit image to be earlier than a time after elapse of a unit period of the video signal from a time of the read signal corresponding to the preceding unit image.

2. The image imaging apparatus of claim 1, wherein the shutter signal immediately after the flash detector determines that the video signal generated by the imager is affected by the flash is not asserted once.

3. An imaging apparatus comprising:

an imager having an imaging element, and configured to convert an optical signal incident from an object into an electrical signal to generate and output a video signal;

a flash detector configured to detect whether the video signal generated by the imager is affected by flash or not; and a flash corrector configured to, if the flash detector determines that the video signal generated by the imager is affected by the flash, generate a video signal in which a bright portion having a band shape affected by the flash is corrected, in the imaging element, a shutter signal defining a time for dumping a charge obtained with exposure controls an electronic shutter operation, the imaging element consecutively generates and outputs the video signal in response to receiving a read signal at a plurality of times each delayed by an exposure period relative to the shutter signal, and if the flash detector determines that the video signal generated by the imager is affected by the flash when an electronic shutter is used, the imager uses the video signal representing a preceding unit image determined to be affected by the flash, and a video signal representing a succeeding unit image which is affected by the flash as well following the preceding unit image to generate a video signal in which a bright portion having a band shape affected by the flash is corrected.

* * * * *